United States Patent [19]
Dennison et al.

[11] Patent Number: 5,606,657
[45] Date of Patent: Feb. 25, 1997

[54] VIRTUAL GRAPHICS PROCESSOR FOR EMBEDDED REAL TIME DISPLAY SYSTEMS

[75] Inventors: Tamara G. Dennison, Palm Harbor, Fla.; Jesse G. Fisher, Albuquerque, N.M.; Steven E. Lindsley, Albuquerque, N.M.; Thomas A. Weingartner, Albuquerque, N.M.

[73] Assignee: Honeywell Inc., Minneapolis, Minn.

[21] Appl. No.: 589,533

[22] Filed: Jan. 22, 1996

Related U.S. Application Data

[63] Continuation of Ser. No. 132,727, Oct. 6, 1993, abandoned.

[51] Int. Cl.$^6$ ..................................................... G06F 15/00
[52] U.S. Cl. ........................... 395/501; 395/507; 395/502
[58] Field of Search ................................... 395/162–166; 364/423; 345/112–133

[56] References Cited

U.S. PATENT DOCUMENTS

| | | | |
|---|---|---|---|
| 5,047,918 | 9/1991 | Schwartz et al. | 364/200 |
| 5,155,822 | 10/1992 | Doyle et al. | 395/400 |
| 5,491,813 | 2/1996 | Bondy et al. | 395/500 |

OTHER PUBLICATIONS

Foley et al., Computer Graphics: Principles and Practice, Second Edition, Chapters 5 and 7, pp. 201–207 and 285–346 (1990).

*Primary Examiner*—Kee M. Tung
*Assistant Examiner*—U. Chauhan
*Attorney, Agent, or Firm*—Kenneth J. Johnson; Mark L. Becker; Ronald E. Champion

[57] ABSTRACT

The virtual graphics processor is a software process that enables different video display systems to execute the same graphical display application. The process also permits the display application to be updated or reconfigured in real time without changing the embedded display system software. The parts of the virtual graphics processor include an application graphics database for storing graphic primitives and associated static primitive data defining one or more graphic pages in a display application. An image control interface (video library) associates graphic functions of the particular video display system with graphic primitives in a requested page. An instruction sequencer within the virtual graphics processor responds to a display request by obtaining the requested graphic page from the graphics database and associated graphics functions from the video library. The addresses of the graphic functions and associated data for the graphic page are passed from the instruction sequencer to an instruction queue. A graphics logic unit reads the addresses from the queue and calls the function, providing each called function with the associated data. The display system responds to the called graphics functions by displaying the requested page with its associated data on a video screen.

12 Claims, 6 Drawing Sheets

VIRTUAL GRAPHICS PROCESSOR FOR EMBEDDED REAL TIME DISPLAY SYSTEMS

GOVERNMENT RIGHTS

The Government has rights in this invention pursuant to Contract No. DAAB-07-87-C-H041, awarded by the Department of the Army.

This application is a continuation of application Ser. No. 08/132,727, filed on Oct. 6, 1993.

BACKGROUND OF THE INVENTION

This invention relates to graphics display systems in which the executable computer code for generating graphics information is embedded in the system hardware. More particularly, this invention relates to a method and apparatus for updating or otherwise reconfiguring graphics information displayed by the system without rewriting the embedded executable code.

Instrumentation such as avionic displays, industrial control displays and other video displays typically have static data such as lines, labels and numbers displayed on a screen. This data is known as a graphic "page" on which dynamic graphic data from external systems such as cameras and various aircraft sensors are displayed. A display application comprises a number of pages for interpreting different types of dynamic data. For example, in military aircraft, a pilot may choose among multiple pages for displaying the relative position of the aircraft, status of a weapon or a view of a target.

It is often desirable to change the nature of the graphic pages that appear on a display after the executable computer code is already embedded in the system hardware. This may occur, for example, if there is a change to the text and labels associated with a page. In a conventional embedded display system, such a change requires rewriting the executable code, recompiling it and substituting it for the existing executable code in the display system. Because the change affects the executable nature of the code, however, the code must be requalified by the appropriate authorities. This can be a time-consuming process.

Aside from the requalifying problem, the conventional approach of changing the executable code can be an enormous task where multiple hardware environments are involved. In an aircraft cockpit, for example, there are multiple graphic display systems of different hardware types such as raster scan, LCD or vector. For each type of display system, each update to a graphic page requires writing executable code unique to each system's associated data processor and then substituting the new code for the old, embedded code.

The present invention over comes these drawbacks of prior graphic display systems by permitting the static graphics information on a display to be changed as much and as often as desired without having to change previously embedded executable code. The invention also permits a change in graphics information to be made only once for all hardware systems, regardless of their different designs.

SUMMARY OF THE INVENTION

An object of the invention, therefore, is to provide an improved method and apparatus for changing the appearance of graphic pages on a video screen without changing the embedded graphics software of a graphics display system.

Another object of the invention is to provide such method and apparatus that are independent of the hardware of the graphics display system.

Yet another object of the invention is to provide such a method and system that can change the appearance of graphic pages as the display operates in real time.

In accordance with these objects, a virtual graphics processor (VGP) for an embedded, real-time display system is shown and described herein. The virtual graphics processor may be implemented in various combinations of software and hardware and includes as its parts data structures and internal processes. One of these parts is a graphics database structure for storing graphic primitives and associated static primitive data defining one or more graphic pages in a display application. Another part is a dynamic memory interface that receives graphic page display requests and associated dynamic data from a control source. The control source passes along user requests for a specific page as well as sensor data to be displayed on the page.

An image control interface (also known as a video library) associates graphic primitives in a requested graphic page with graphics functions of the particular display system. The image control interface may include the graphics functions for the display system and addresses for each of the graphics functions therein. This interface allows the virtual graphics processor to work with multiple hardware systems because the hardware is now transparent to the graphics database.

An instruction sequencer within the virtual graphics processor responds to a display request. The sequencer obtains the graphic primitives and addresses of associated static and dynamic data of a requested graphic page from the graphics database and the dynamic memory interface. The addresses for the associated graphics functions are obtained from the image control interface. The sequencer may route this information to an instruction queue that stores the addresses of the associated graphics functions and of the static and dynamic data obtained by the instruction sequencer.

To display the graphic page and associated dynamic data, a graphics logic unit in communication with the instruction queue and image control interface calls the associated graphics functions from the image control interface. The logic unit provides each called function with associated static and dynamic data. The video display system responds to the called graphics functions by displaying a requested graphic page with dynamic data.

To modify a display application, a user generates graphic primitives and associated static and dynamic primitive data defining additional graphic pages. The user then loads these newly generated pages into the graphics database to replace one or more stored graphic pages. Such a change in the primitives and data within the graphics database is not a change to the executable code for the display system, and thus does not require requalification.

The foregoing and other objects, features, and advantages of the invention will become more apparent from the following detailed description of preferred embodiments which proceed with reference to the accompanying drawings.

DETAILED DESCRIPTION OF PREFERRED EMBODIMENTS

Figure 1:
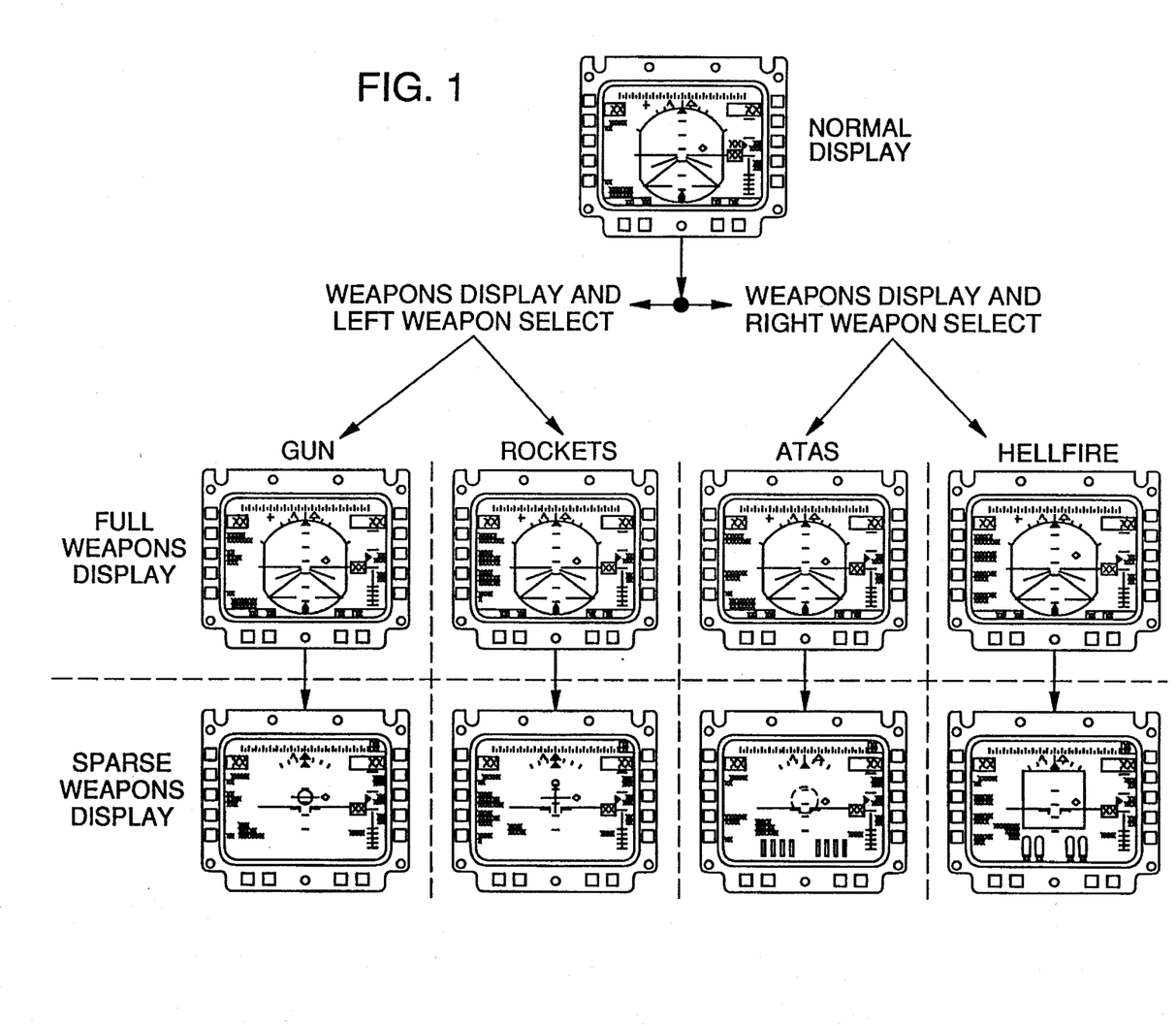
FIG. 1 is an example of a video display application comprising one or more graphic pages visible to an operator for conveying information graphically.

An embedded display application may be characterized by a set of one or more graphic "pages" that can be presented on a screen of a video display system. Graphic pages and the technology for displaying graphical information are well understood in the art, as described by J. D. Foley, A. Van Dam et al. in *Computer Graphics: Principles and Practice,* 2d Ed., Addison-Wesley Publishing Co., 1990. This publication is incorporated by reference for purposes of illustrating the state of the art. A graphic page is a display screen comprising graphic primitives such as lines and text. The control and position of these graphic primitives is performed via static primitive data within the computer code of the video system and dynamic primitive data gathered from external sensors. FIG. 1 is an example of a display application with various graphic pages for a video display in an armed aircraft. Typically, an operator can select among different pages by pressing buttons or flipping switches on a control panel.

In prior systems, the computer code comprising the graphic primitives, static primitive data, and dynamic data reference is compiled along with the executable code that generates pages from the primitives and data. This executable code is then embedded into nonvolatile memory in the video display system such as ROM or PROM. Before the system may be used, however, the executable code must be qualified through a testing procedure to ensure that it works properly. If several video display systems are present in an environment, such as a raster scan-based system, a vector-based system and a LCD-based system, the executable code for each system will differ even if the graphic pages they are to display are the same. The executable code for each different system must also be qualified. Thus one obvious drawback of prior systems is the need for continual requalification each time a change or update to the executable code is made. Another drawback is the need for expertise in several computer instruction sets in order to write the executable code for different display systems.

Figure 3:
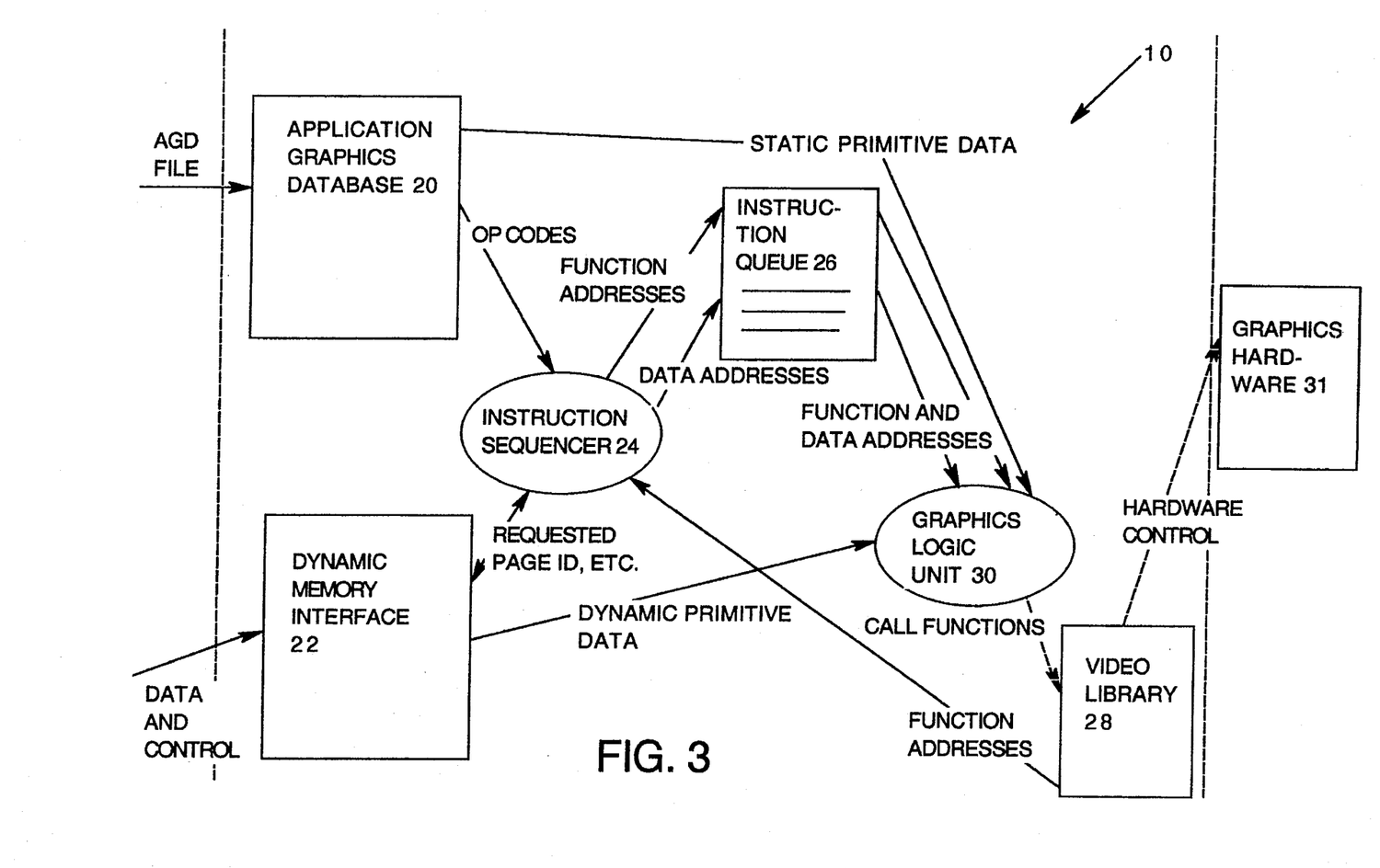
FIG. 3 is a dataflow diagram of the virtual graphics processor which includes an instruction sequencer and graphics logic unit.

Unlike prior video display systems, the present invention allows changes and updates to display applications without modifying the embedded, executable code. FIG. 3 is a dataflow diagram of a virtual graphics processor 10 according to the invention. The term "virtual graphics processor" (VGP) is appropriate for the invention because the present embodiment is not a typical hardware graphics processor. Rather, it is virtual in the sense that it is a software process that in essence is a graphics processor but without the hardware constraint. As will be described, the virtual graphics processor may be embodied in hardware data processors, memories, etc., of various configurations, or may be designed into a single device.

Figure 2:
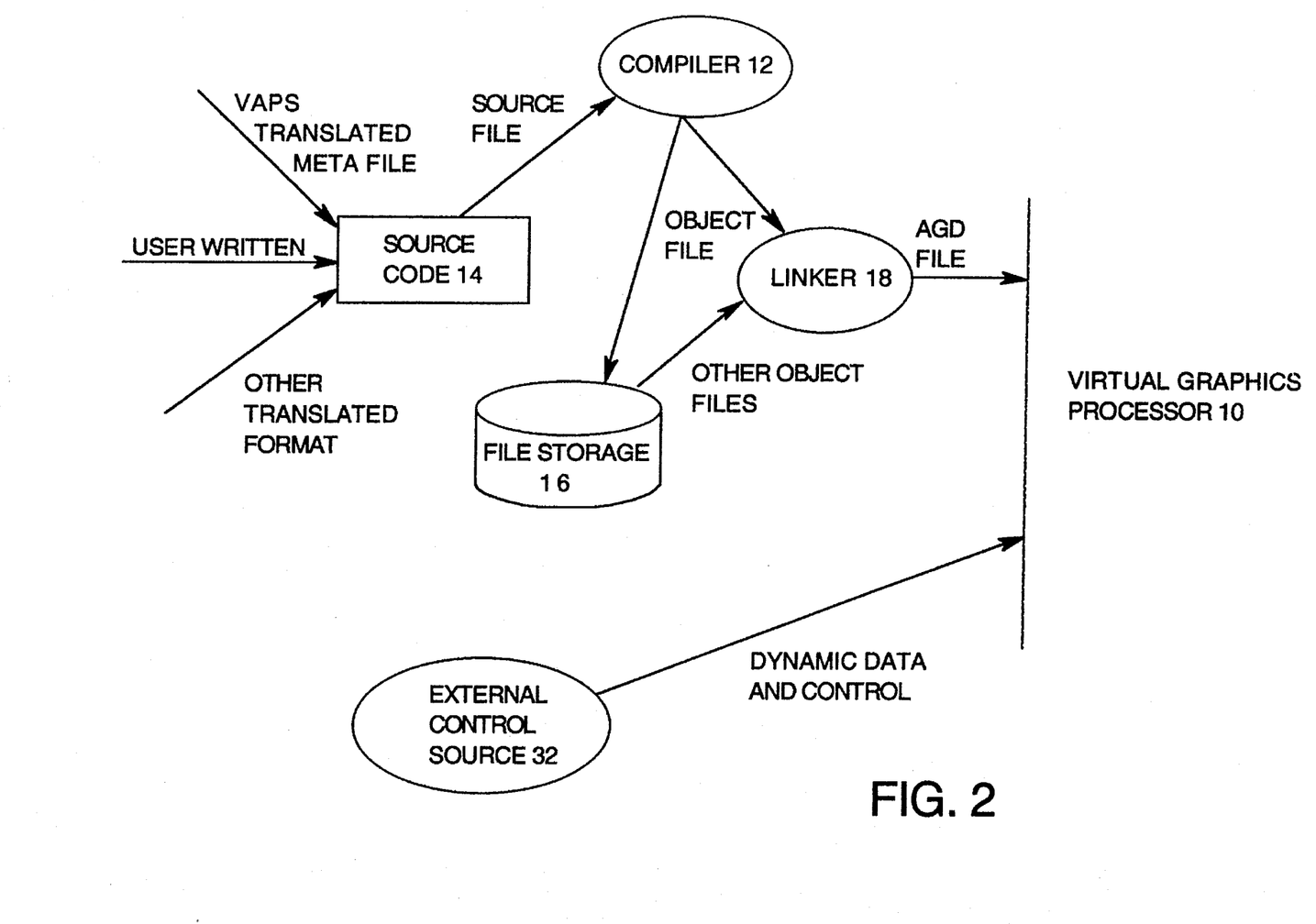
FIG. 2 is a dataflow diagram of a graphical language process and external processor control that interacts with a visual graphics processor according to the invention.

FIG. 2 illustrates a graphical language process as a means for generating graphic primitives and associated static primitive data for defining initial and additional graphic pages. The means includes a compiler 12 of conventional design for translating source code 14 for a graphic page file into an object file. The source code language is an intermediate graphical language that allows a user to draw two-dimensional graphics independent of a particular graphics processor. Writing such a language and related compiler is well within the ability of one of ordinary skill in the art. There is no "best" language—its design is a function of the desired design goals. The graphical language allows a designer to describe a desired graphical page in terms of graphic primitives or a group of page primitives (sometimes referred to in the art as page objects) and the data used to manipulate and control the graphic primitives. The source code may be generated in a number of ways. The designer may use a graphics-based prototyping system such as VAPS available from VP Inc., of Montreal, Canada. Such a system allows a designer to draw a desired graphic page on screen. The system then translates the graphic image into source code. Another way is for the designer to write directly the source code using a standard text editor. A third way is to translate source code written in another language into the graphical language of the compiler using a conventional translator program.

The object file, which represents a graphic page, may be linked with other object files representing other graphic pages in a display application. The other graphic pages are typically stored in a file storage unit 16 and are linked together with the newly created object file with a conventional linker 18. The collection of linked object files representing a display application is referred to herein as an application graphics database (AGD) file, which is loaded into the virtual graphics processor.

To ensure hardware independence, the page files do not contain any hardware-dependent code. As will be described, the virtual graphics processor 10 includes a data structure known as an image control interface (also known as a video library) that contains graphics functions for a particular display system. By separating the hardware dependency from the means for generating the graphic pages, the designer need not know the intricacies of each and every display system.

FIG. 3 shows the several parts of the virtual graphics processor 10 including an application graphics database structure 20, a dynamic memory interface 22, an instruction sequencer 24, an instruction queue 26, an image control interface (video library) 28, and a graphics logic unit (also known as a screen engine) 30. The virtual graphics processor is an embedded software process, and these parts comprises data structures and internal processes within the overall process of the virtual graphics processor. The output of the virtual graphics processor is a series of calls to the image control interface 28 for the graphics functions of the particular display system. These functions, along with static and dynamic data supplied as arguments thereto, are passed to the system's graphics hardware 31 for display of the graphic page and data. The graphics hardware is conventional and may comprise a hardware graphics controller, associated logic, a video display such as a CRT or LCD screen, and any other hardware needed to create an image.

FIG. 2 also shows an external control source 32 such as a host hardware processor that control the overall operation of the video display system and thus the virtual graphics processor 10. Through the control source, an operator selects which graphic page of a display application is to be displayed. The control source also provides a route for dynamic primitive data, i.e., velocity, temperature, picture, etc., to the virtual graphics processor. This dynamic data provides the value of the dynamic text and images that are displayed on a graphics page in real time.

Figure 4:
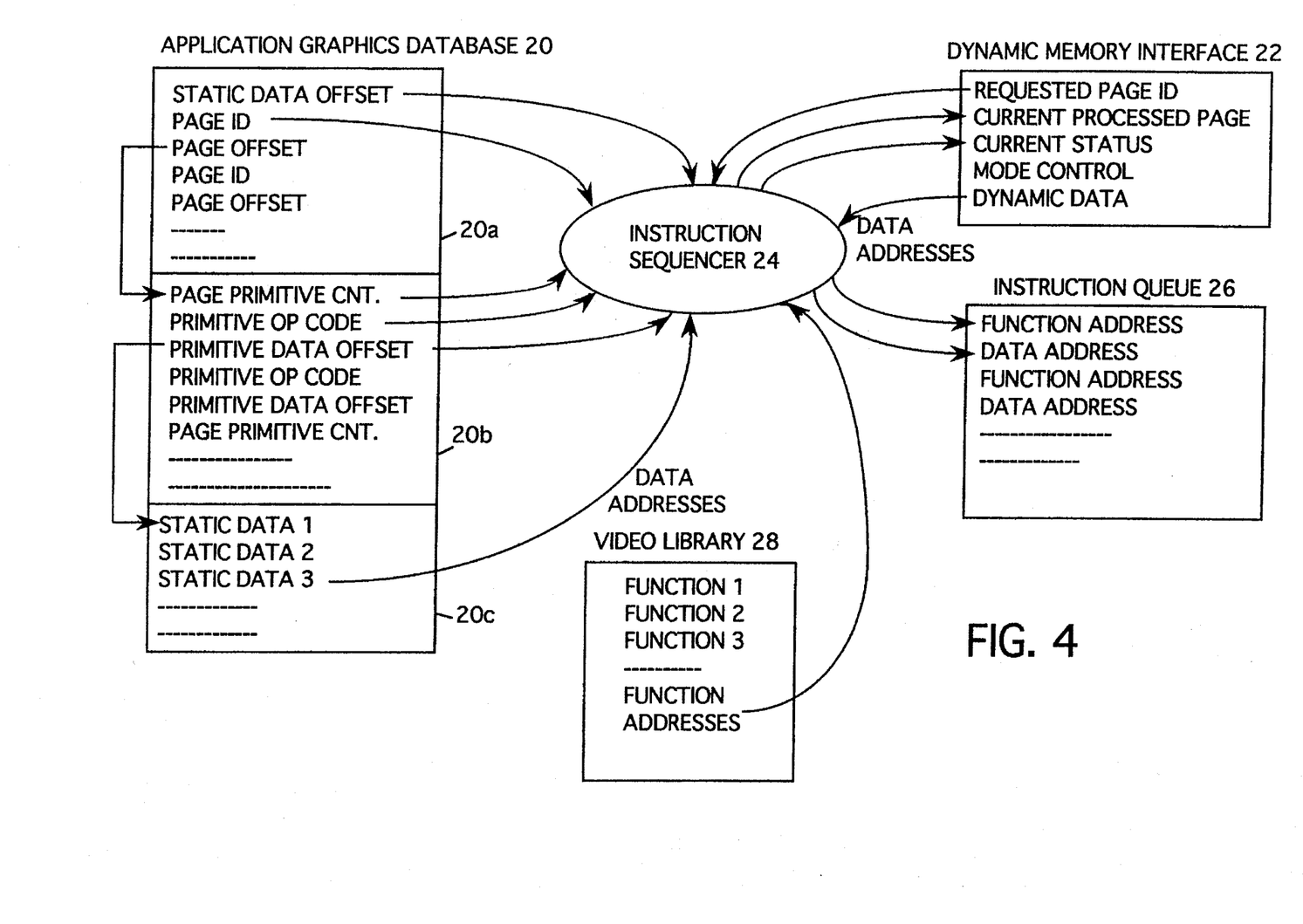
FIG. 4 is a more detailed dataflow diagram of the relationship between the instruction sequencer and other parts of the virtual graphics processor.

FIG. 4 shows in greater detail the structure of the applications graphics database 20 and the other processor parts 22, 26 and 28 and what they communicate to the instruction sequencer 24. The applications graphics database 20 resides in programmable memory (such as RAM or EE PROM) that may be shared between the control source 32 or is local to the processor 10. The contents of the database 20 may be changed in real time simply by downloading new graphic pages into the programmable memory.

The database 20 comprises three primary sections: a page directory 20a, a page primitives list 20b, and a static primitive database 20c. The page directory 20a contains header and page index information for the database and a static data offset. The static data offset provides the instruction sequencer 24 with the location of the static data and resolves the location of the static data for the instruction queue 26. The header establishes the page index, which comprises page identifications (page IDs) for the graphic pages in the display application. Associated with each page ID in the index is a page offset into the page primitives list 20b. The page primitives list contains, for each page, a count of the number of primitive operations (draw line, attributes, etc.,) for that page, the operation codes for each of these primitives, and data offsets into static database 20c and dynamic memory interface 22 for the static and dynamic primitive data for each operation. The static database 20c contains the static data required by the page primitives. This data may be shared among several primitives to reduce redundant entries. The dynamic primitive data is contained within the dynamic memory interface 22.

The dynamic memory interface 22 is a data structure stored in local memory for allowing the external control source 32 to control and monitor the operation of the virtual graphics processor 10. The interface 22 provides external source-requested page IDs and dynamic primitive data to the instruction sequencer 24. The instruction sequencer in turn provides the external control source 32 via the interface 22 with the current page ID, operational status and current mode of the processor. Data such as current screen color, processor performance, etc., is provided. With this return information, the control source 32 can determine if the processor is operating properly.

The image control interface (video library) 28 is a data structure in local processor memory for establishing an interface between the unique graphics environment of a particular video display system and the virtual graphics processor 10. The video library associates page primitives from the applications graphics database with the graphics functions (also known as graphics drivers) of the particular video display system. The graphic controller of each different video display system requires graphics drivers written in the controller's instruction set. Specifically, the video library 28 contains graphics functions that are used for drawing the graphic pages and the addresses of these functions.

The instruction queue 26 is a circular list of function addresses from the video library 28 and static and dynamic data addresses from the applications graphics database 20 and dynamic memory interface 22, respectively. The queue is stored in system memory. These addresses are read from the queue in a first in, first out order (FIFO) by the graphics logic unit 30. The queue structure 26 allows the graphics logic unit to be a process independent of the instruction sequencer and other part of the virtual graphics processor, operating at its own rate and on its own hardware. By separating the processes in this fashion, multiple graphics logic units can be employed in a distributed processing scheme to increase process throughput as will be described.

The instruction sequencer 24 is a process within the virtual graphics processor 10 which controls the instruction and data provided to the graphics logic unit 30. Its operation is summarized in the following Table 1. The program in the table is in pseudocode from which source and object code are derivable.

TABLE 1

Pseudocode for Instruction Sequencer

```
GET REQUESTED PAGE ID
DOES REQUESTED PAGE ID MATCH CURRENT PROCESSED PAGE
IF YES, QUIT
ELSE
.....UPDATE CURRENT PROCESSED PAGE
.....UPDATE CURRENT STATUS
.....CHECK REQUESTED PAGE ID AGAINST PAGE IDS IN PAGE
            DIRECTORY
.....IF NO MATCH OCCURS, UPDATE CURRENT STATUS AND QUIT
.....ELSE
..........GO TO PAGE PRIMITIVE LIST POINTED TO BY PAGE
            OFFSET
..........GET PAGE PRIMITIVE COUNT FOR THAT PAGE
..........FOR NUMBER OF PRIMITIVE IN PAGE DO FOLLOWING:
...............GET PRIMITIVE OP AND PUT FUNCTION ADDRESS
            INTO INSTRUCTION QUEUE
...............GET PRIMITIVE DATA OFFSET
....................IF OFFSET IS STATIC DATA PUT STATIC
........................DATA ADDRESS IN INSTRUCTION QUEUE
........................ELSE PUT DYNAMIC DATA ADDRESS IN
            INSTRUCTION QUEUE
FINISHED
```

Briefly, the instruction sequencer responds to a page ID request from the control source 32, initiated by an operator, to display a desired page. If that page already appears on the video display of the system's graphics hardware 31, then the sequencer confirms to the control source the present page as the Current Processed Page and quits until the next cycle. The dynamic data address received from the memory interface 22 to the instruction sequencer does not change, although the dynamic data itself stored within the interface continually changes.

If the operator has selected a new graphics page to display, the requested page ID is different. The sequencer in response updates the Current Processed Page echoed to the control source. It also updates the Current Status data on the video display system, which it sends to the control source.

The sequencer 24 then checks the requested page ID against the page IDs in the page directory 20a. The requested page ID should normally be in the directory, but if no match is found the sequencer informs the control source via Current Status and halts. When a match does occur, the sequencer 24 turns to the page primitive list 20b at the page offset given in the page directory 20a and gets the page primitive count for the requested graphic page.

For each page primitive in the graphic page, the instruction sequencer retrieves the primitive operation code (op code) and primitive data offset from the page primitive list 20a. If the offset is to the static database, the sequencer obtains the address for the associated static primitive data. If the offset is to the dynamic memory interface, the sequencer obtains the address for the associated dynamic primitive data. The sequencer uses the primitive op codes to find the associated graphics functions in the video library 28 and stores the functions' addresses in the instruction queue 26. The sequencer also stores the addresses of the associated static and dynamic data in the queue as well. Thus at the end of each cycle of the instruction sequencer, the instruction queue holds the addresses of the particular graphics functions, static data and dynamic data addresses thus defining a graphic page for use in real time.

Figure 5:
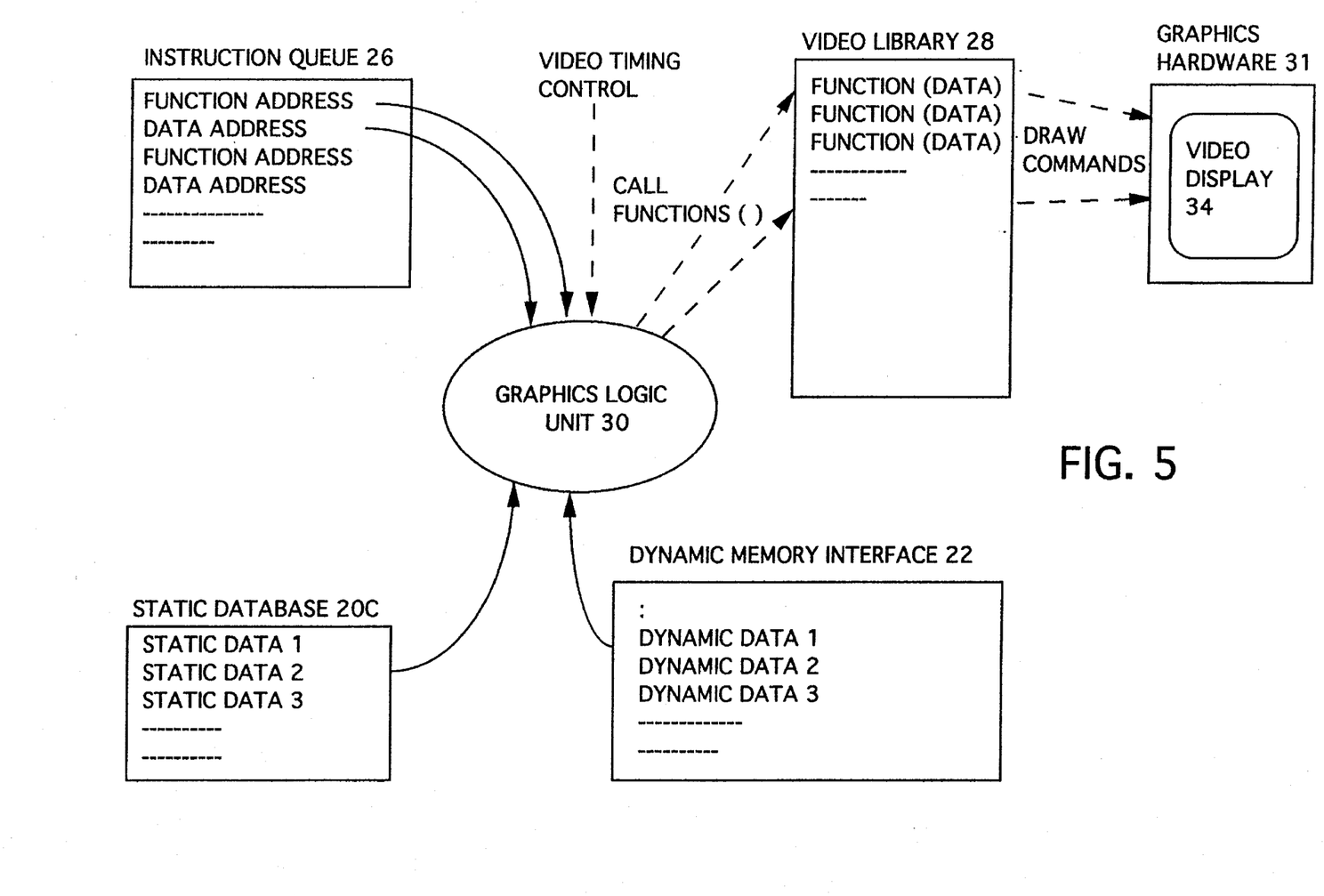
FIG. 5 is a more detailed dataflow diagram of the relationship between the graphics logic unit and other parts of the virtual graphics processor.

FIG. 5 is a more detailed dataflow diagram of the relationship between the graphics logic unit 30 and the processor parts 20c, 22, 26 and 28. The graphics logic unit 30 operates upon instructions that reside in the instruction queue 26. These instructions comprise the function and data addresses stored therein, and are read from the instruction queue in the order they were entered. The following Table 2 summarizes the logic unit's operation:

TABLE 2

Pseudocode Graphics Logic Unit

WHEN INITIATED BY VIDEO TIMING CONTROL
..... FOR EACH FUNCTION ADDRESS IN THE INSTRUCTION QUEUE
.......... GET DATA REFERENCED BY DATA ADDRESS
.......... CALL FUNCTION IN VIDEO LIBRARY WITH REFERENCED
         DATA

The video timing control signal is generated by internal interrupt processing or other external cyclic control to periodically update the graphic page on the video screen 34. Video timing control synchronizes the virtual graphics processor 10 with the video timing of the particular graphics hardware 31 in use. Controlling the processor 10 in this manner provides coordination for updating information and refreshing the video display. For each function address in the instruction queue 26, the graphics logic unit 30 retrieves the data referenced by the associated data addresses. It first reads the static database 20c at the specified static data addresses to obtain the associated static primitive data. It then reads the dynamic memory interface 22 at the specified dynamic data addresses to obtain the associated primitive data. Finally, it calls each addressed graphics function in the video library 28 and supplies it with the referenced data. This function is an instruction within the graphic hardware 31 of the particular video system, and describes to the video system the graphic page in terms of instructions unique to the particular video system.

We wish to emphasize that this software process we call the virtual graphics processor is not tied to a specific hardware configuration. The entire process, including the instruction sequencer 24 process and graphics logic unit 30 process, may execute one a single data processor with associated RAM, ROM and other memory. However, if complex graphical displays are required such as three-dimension objects, the graphics generation throughput (i.e., the number of graphic functions executed per second) may be substantially increased by executing the instruction sequencer and graphics logic unit on separate data processors. This separation is possible because of the instruction queue 26, which acts as a buffer between the two processes and allows them to execute at different rates. For example, the instruction sequencer 24 may reside within an Intel 80960 microprocessor and the graphics logic unit 30 may reside within a Texas Instrument TI34020 graphics processor. The instruction queue 26 linking the two processes may reside within a conventional dual port RAM accessible by both of these data processors.

Figure 6:
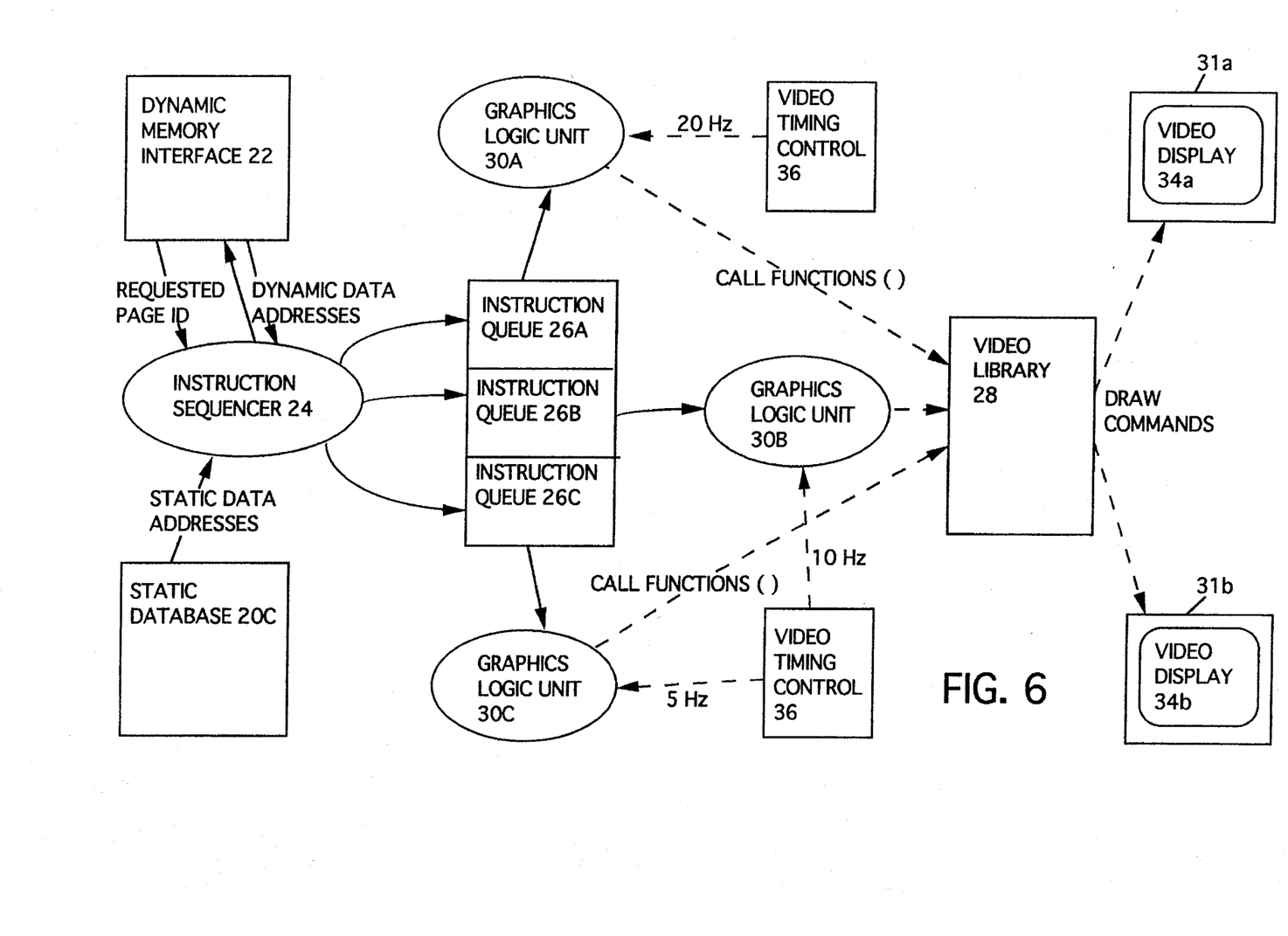
FIG. 6 is a dataflow diagram showing a second embodiment of the virtual graphics process with multiple graphics logic units for increasing the throughput of the process.

The graphics throughput may be further increased by providing multiple graphics logic units such as shown in FIG. 5, where some dataflow connections and signal labeling have been omitted for clarity. Instruction queue 26 may be divided into multiple queues 26a–26c providing function and data addresses to corresponding multiple graphics logic units 30a–30c. The instruction sequencer 24 may sort the graphic functions it stores in instruction queues 26a–26c by task, frequency of execution, etc., for further efficiency. Each associated graphics logic unit 30a–30c then calls the graphics functions from its queue periodically, depending on the rate determined by the video timing control 36 of the particular video display system. With this technique, the allocation of graphics generation is now distributed across parallel data processors each running at different video frame rates. One graphics logic unit can be responsible for static data generation, while another is responsible for dynamic data generation. Redundancy through multiple graphics logic units may also be designed into the virtual graphics processor for fault tolerant operation. The output of the video library 28 may be directed to multiple graphics hardware 31a, 31b and related video displays 34a, 34b.

Having illustrated and described the principles of the invention preferred embodiments, it should be apparent to those skilled in the art that the invention can be modified in arrangement and detail without departing from such principles. For example, it is possible for the instruction sequencer 24 to provide the instruction queue 26 with the graphic primitives and data directly rather than the addresses. But in such a design the dynamic data would not be updated in real time when used by the graphics logic unit 30. Features of the invention shown in software may be carried out in hardware and features in hardware may be carried out in software. Thus the illustrated embodiments should be considered examples only of preferred forms of the invention and not as limitations on the scope of the claims.

We therefore claim all modifications and equivalents to the illustrated embodiments coming within the scope and spirit of the following claims. The words of these claims are to be given their ordinary and accustomed meaning to one of ordinary skill in the art unless it clearly appears that we intended to use them differently.

The embodiments of the invention in which an exclusive property or right is claimed are defined as follows:

1. A virtual graphics processor for an embedded, real-time video display system, comprising:

a graphics database structure for storing graphic primitives and associated static primitive data defining one or more graphic pages in a display application;

a dynamic memory interface for receiving graphic page display requests and associated dynamic primitive data from a control source;

an image control interface which includes graphic functions for a plurality of display systems, said image control interface associates graphic primitives in a requested graphic page with graphics functions of a particular display system of said plurality of display systems, which is currently in use, the interface including the graphics functions and addresses for the graphics functions;

an instruction sequencer responsive to a request to display a graphic page, for obtaining the graphic primitives and addresses of associated static data of a requested graphic page from the graphics database and addresses for the associated graphics functions from the image control interface;

an instruction queue for storing the addresses of the associated graphics functions and of the static data obtained by the instruction sequencer; and a graphics logic unit in communication with the instruction queue and image control interface for calling the associated graphics functions in the queue and providing each called function with associated static and dynamic data, the display system responsive to the called graphics functions for displaying a requested graphic page with dynamic data.

2. The virtual graphics processor of claim 1 wherein the dynamic memory interface comprises a data structure stored in a memory device.

3. The virtual graphics processor of claim 1 wherein the image control interface comprises a data structure stored in a memory device.

4. The virtual graphics processor of claim 1 wherein the instruction sequencer comprises a process executed on a data processor.

5. The virtual graphics processor of claim 1 wherein the graphics logic unit comprises a process executed on a data processor.

6. The virtual graphics processor of claim 1 wherein the instruction queue comprises a data structure stored in memory device.

7. A virtual graphics processor for an embedded, real-time video display system, comprising:

a graphics database structure for storing graphic primitives and associated primitive data defining one or more graphic pages in a display application;

an image control interface, which stores graphic functions for a plurality of display systems, said image control interface associates graphic primitives in a requested graphic page with the graphics functions of a particular display system of the plurality of display systems;

means, responsive to a request to display a graphic page, for calling the graphics functions associated with the requested page from the image control interface and providing each called function with associated primitive data, the particular video display system responsive to the called graphics functions for displaying the requested graphic page; and a dynamic memory interface for receiving graphic page display requests and associated dynamic primitive data.

8. The virtual graphics processor of claim 7 wherein the means responsive to a graphic page display request for calling the associated graphics functions comprises an instruction sequencer and a graphics logic unit.

9. The virtual graphics processor of claim 7 wherein the means for calling the associated graphics functions further provides the called function with dynamic data for display on the requested graphic page.

10. A method of displaying graphic information for a plurality of video display systems, comprising:

generating graphic primitives and static data defining graphic pages;

providing a graphics database structure in memory for storing graphic primitives and associated primitive data defining one or more graphic pages in a display application;

loading the generated graphic primitives and static data into the graphics database;

in response to a request to display a graphic page, associating the graphic primitives for the requested page with graphics functions of a particular display system of the plurality of display systems;

calling the associated graphics functions; and providing each called function with the associated primitive data to display the requested graphic page.

11. The method of claim 10 wherein the stored primitive data is static data, the method including:

receiving dynamic primitive data associated with a requested graphic page; and providing each called function with the associated dynamic data to display the requested graphic page with dynamic data.

12. A method of displaying graphic information for a plurality of video display systems, comprising:

providing a graphics database structure in memory for storing graphic primitives and associated primitive data defining one or more graphic pages in a display application;

in response to a request to display a graphic page, associating the graphic primitives for the requested page with graphics functions of a particular display system of the plurality of display systems;

receiving dynamic primitive data associated with a requested graphic page;

calling the associated graphics functions;

providing each called function with the associated dynamic data to display the requested graphic page with dynamic data; and providing each called function with the associated primitive data to display the requested graphic page.

\* \* \* \* \*